Patented Oct. 11, 1927.

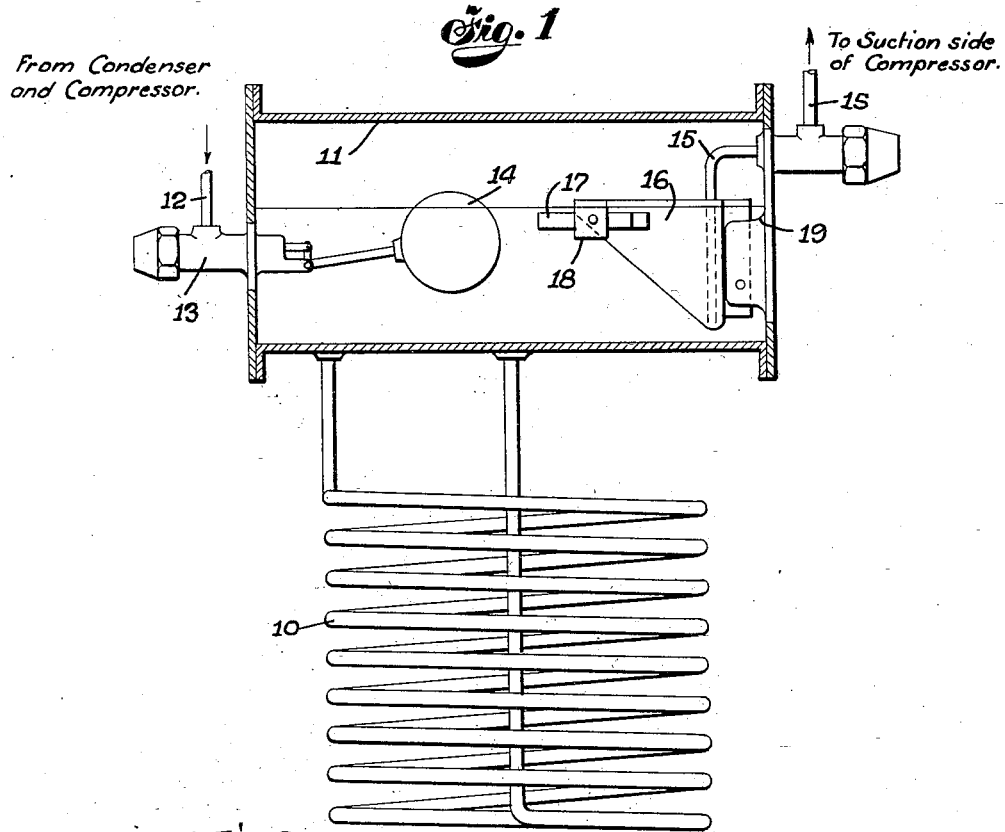
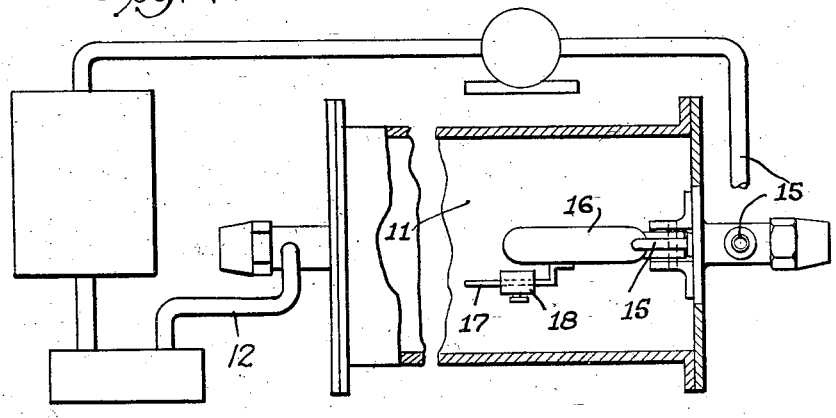

1,645,314

UNITED STATES PATENT OFFICE.

EDWARD T. WILLIAMS, OF BROOKLYN, NEW YORK.

REFRIGERATING APPARATUS.

Application filed July 11, 1925. Serial No. 42,866. REISSUED

In some refrigerating systems lubricant from the interior of the compressor passes through the condenser into the expansion chamber, and, if allowed to accumulate therein, seriously impairs the efficiency of the apparatus. In so-called "flooded" systems, in which a body of liquid refrigerant is maintained in the expansion chamber or coils, it has been proposed to use a lubricant which is lighter than the liquid refrigerant, so that it will float on the latter, but if allowed to accumulate thereon it interferes with the operation of the float valve which is intended to keep the liquid refrigerant constant in volume. I have accordingly been led to devise my present invention, which has for its object to provide simple but thoroughly effective means for removing the lubricant. To this and other ends the invention consists in the novel features and combinations hereinafter described.

Referring to the accompanying drawings, Fig. 1 illustrates the preferred form of my invention in vertical section.

Fig. 2 is a detail sectional plan view.

In the system illustrated, the expansion coils 10 receive liquid refrigerant from a chamber 11 which in turn receives liquid refrigerant through pipe 12 from the condenser and compressor, not shown. The outlet of the refrigerant supply pipe 12 is controlled by a valve 13 which is itself operated by a float 14, in the usual manner, to maintain a constant liquid-level in the chamber, as will readily be understood. As the refrigerant is evaporated, the vapor collects in the chamber 11 and is led back to the suction or low pressure side of the compressor by a pipe 15.

If the lubricant passing to the chamber 11 and floating on the refrigerant therein is not removed it will, since it is non-volatile, displace more or less of the refrigerant, thus impairing the efficiency of the apparatus as well as robbing the compressor of lubricant.

In accordance with my present invention I prevent this accumulation, by removing the lubricant as fast as it enters the chamber. For this purpose I provide a floating skimmer, light enough to float in the refrigerant but too heavy to float in the lubricant. In its preferred form the skimmer is a narrow, open-topped vessel of triangular form 16, pivoted at one end near its bottom, and having an arm 17 carrying an adjustable weight 18 by which the buoyancy of the chamber can be regulated as desired. The pipe 15 is extended into the skimmer to a point near its bottom, as shown.

As before stated, the float 14 maintains the surface of the liquid at a constant height. If a part of the liquid is a floating layer of oil, it is clear that as the oil increases in depth, the surface of the refrigerant descends. But as the refrigerant level falls, the buoyant effect on the skimmer is decreased. As a result the latter swings down with the result that the floating oil pours over its edge, and, submerging the intake orifice of pipe 15, is sucked back to the compressor. The draining of the floating oil or other lubricant into the skimmer lowers the liquid level in chamber 11, whereupon the float 14 falls, admitting liquid refrigerant until the latter rises high enough to raise the skimmer out of the remaining layer or film of oil. If, at this stage, the float 14 has not risen far enough to close valve 13, the refrigerant in the chamber will continue to rise until valve 13 is closed, but at no time can refrigerant overflow into the skimmer in any material amount since the skimmer always floats with its edge slightly above the surface of the refrigerant. On the other hand, a slight increase in the thickness of the lubricant layer will cause the latter to overflow into the skimmer and be sucked back to the compressor. Hence the lubricant cannot accumulate beyond a certain amount, which can be made practically as small as desired by proper design and adjustment of the parts. A stop 19 may be provided to limit the upward swing of the skimmer, preferably so located as to arrest the skimmer at the moment the float valve closes. This prevents the skimmer from ever rising too high to receive floating lubricant and hence insures that the latter cannot accumulate unduly.

It is to be understood that the invention is not limited to the specific devices herein illustrated and described but can be embodied in other forms without departing from its spirit.

I claim—

1. In a refrigerating system having a compressor, the combination with a chamber for liquid refrigerant, and means for maintaining a constant liquid level therein, of a skimmer floating in the liquid refrigerant to receive lubricant floating on the refrigerant, and means for removing the lubricant from the skimmer, and delivering the same to the compressor.

2. In a refrigerating system having a compressor, the combination with a chamber for liquid refrigerant, and means for maintaining a constant liquid level therein, of a pivoted skimmer floating in the refrigerant to receive lubricant from the surface of the refrigerant, and means for removing the lubricant from the skimmer, and delivering the same to the compressor.

3. In a refrigerating system having a compressor, the combination with a chamber for liquid refrigerant, and means for maintaining a constant liquid level therein, of a floating skimmer in the chamber, to receive lubricant from the surface of the refrigerant, the skimmer being heavier than the lubricant but lighter than the refrigerant, and means for removing the lubricant from the skimmer and evaporated refrigerant from the chamber and delivering both to the compressor.

4. In a refrigerating system having a compressor, the combination with a chamber for liquid refrigerant, of a floating open-topped vessel for skimming lubricant from the surface of the refrigerant, said vessel being lighter than the refrigerant but heavier than the lubricant, and means for removing the lubricant from the vessel, and delivering the same to the compressor.

5. In a refrigerating system, the combination with a chamber for liquid refrigerant, of means for removing lubricant from the surface of the refrigerant, comprising an open-topped tapering vessel adapted to float with its edge above the surface of the refrigerant, but too heavy to float in the lubricant, and a suction pipe extending into the vessel adjacent to the bottom thereof for withdrawing lubricant therefrom.

6. In a refrigerating system having a compressor, the combination with a chamber for liquid refrigerant, and means for maintaining a constant liquid level therein, of a skimmer floating in the liquid refrigerant to receive lubricant floating on the refrigerant, and means for conducting the lubricant from the skimmer.

7. In a refrigerating system having a compressor, the combination with a chamber for liquid refrigerant, and means for maintaining a constant liquid level therein, of a pivoted skimmer floating in the refrigerant to receive lubricant from the surface of the refrigerant, and outlet means for permitting removal of the lubricant from the skimmer.

8. In a refrigerating system having a compressor, the combination with a chamber for liquid refrigerant, and means for maintaining a constant liquid level therein, of a floating skimmer in the chamber, to receive lubricant from the surface of the refrigerant, the skimmer being heavier than the lubricant but lighter than the refrigerant, and means for conducting the lubricant from the skimmer.

In testimony whereof I hereunto affix my signature.

EDWARD T. WILLIAMS.